United States Patent [19]
Daniels

[11] 3,979,985
[45] Sept. 14, 1976

[54] SHEET TRANSFER BETWEEN A TURRET PUNCH PRESS AND AN ADJACENT APPARATUS
[75] Inventor: Dennis Daniels, Bellevue, Wash.
[73] Assignee: U.S. Amada, Ltd., City of Industry, Calif.
[22] Filed: Feb. 18, 1975
[21] Appl. No.: 550,440

Related U.S. Application Data
[60] Division of Ser. No. 386,064, Aug. 6, 1973, which is a continuation-in-part of Ser. No. 359,938, May 14, 1973, abandoned.

[52] U.S. Cl. ............................ 83/410; 29/35.5; 29/38 C; 29/563; 83/414; 214/1 BB; 269/57
[51] Int. Cl.² ...................... B26D 9/00; B65H 35/00
[58] Field of Search .......... 214/1 BB, 1 BC; 83/281, 83/405, 410, 412, 414; 29/35.5, 36, 38 C, 563, 568; 269/57

[56] References Cited
UNITED STATES PATENTS
3,339,273  9/1967  Knosp .................................. 29/568
R26,770  1/1970  Lemelson ............................ 29/33 P Primary Examiner—Othell M. Simpson
Assistant Examiner—Z. R. Bilinsky
Attorney, Agent, or Firm—Seed, Berry, Vernon & Baynham

[57] ABSTRACT

A rotary turret, numerically controlled punch press is provided with a discharge station at 90° from a punching station. A part is clamped in the turret, separated from a larger workpiece and then rotated with the turret to the discharge station. A transfer arm having a part clamping mechanism is slaved to the NC punch press, engages the part at an exact attitude and position relative to a reference point on the part and transfers the part to a rotary chuck or part holder. The part is placed in the chuck at an exact attitude and with the reference point at the axis of rotation of the chuck.

12 Claims, 10 Drawing Figures

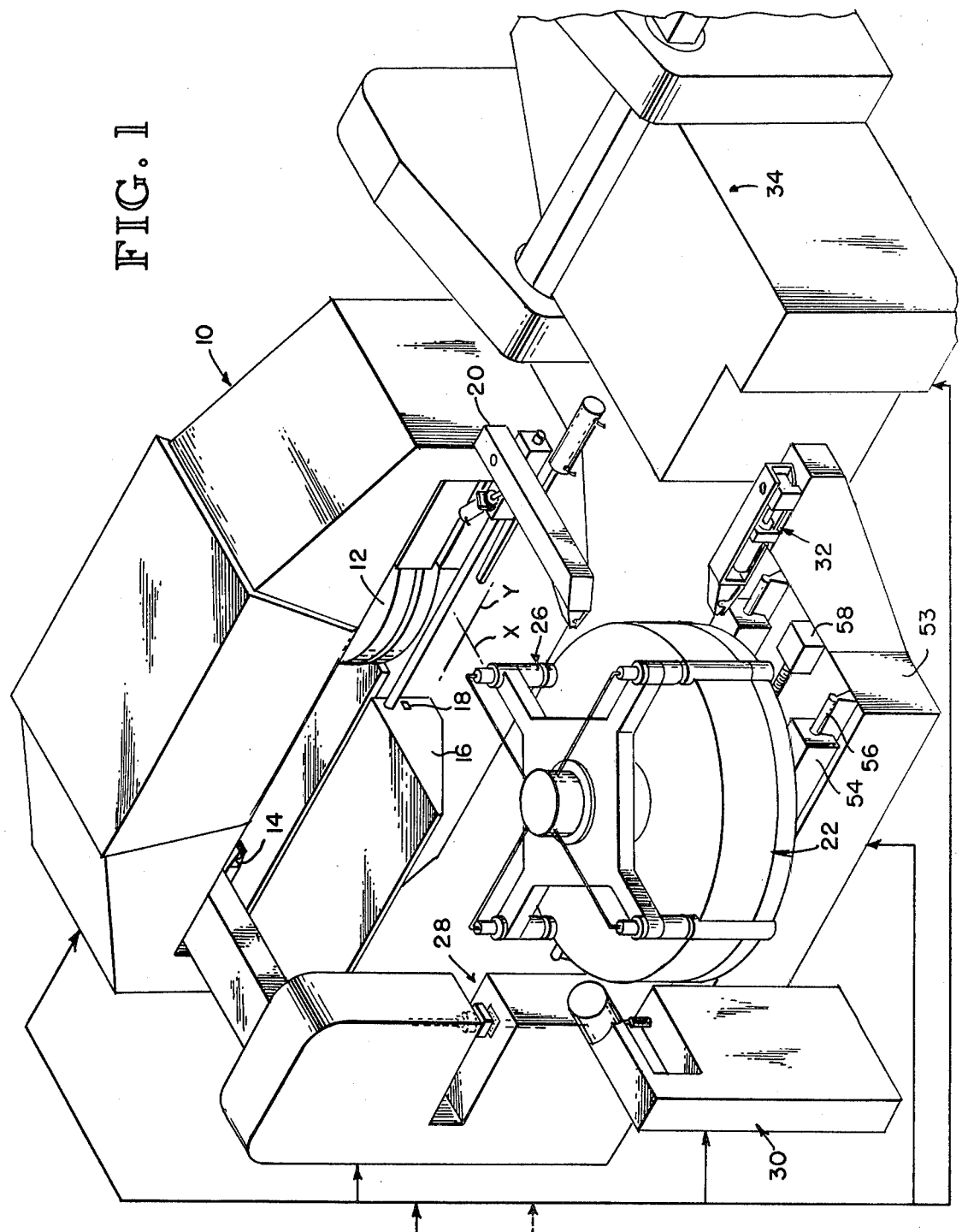
FIG. 1
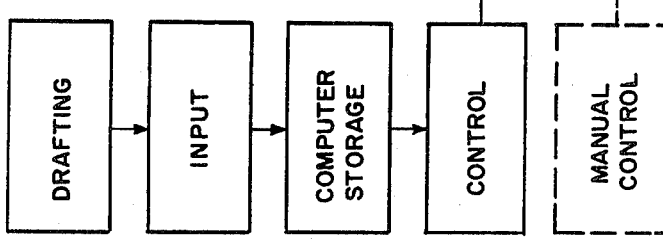

SHEET TRANSFER BETWEEN A TURRET PUNCH PRESS AND AN ADJACENT APPARATUS

CROSS-REFERENCE TO RELATED APPLICATIONS

This is a division of application Ser. No. 386,064, filed Aug. 6, 1973, which is a continuation-in-part of application Ser. No. 359,983, filed May 14, 1973, now abandoned.

BACKGROUND OF THE INVENTION

1. Field of the Invention

This invention pertains to sheet material handling and fabricating methods and systems and components of such systems. The sheet material is of the self-shape-sustaining type, such as plastic, wood or metal.

2. Description of the Prior Art

In many industries, particularly the aerospace industry, there is a need for the mechanized production of a relatively few irregularly shaped sheet material parts. For example, only two or three hundred such parts may be needed in a year. Presently, these parts are made by first cutting a templet and then, either by hand or with limited machinery, cutting the shape of the templet in the sheet material. After the part is cut, a considerable amount of manual deburring of the cut edge is required, with still more surface finishing following. The cost of such individual parts is quite high and, since a particular industry may need as many as two or three thousand different shaped parts manufactured in this way, the ultimate cost is considerable.

There is, therefore, a need in the sheet material handling and fabricating industry for an apparatus or method to mechanize the production of a large variety of relatively few parts of sheet material. While the numerically controlled punch press is a useful tool for satisfactorily fabricating holes or the like internally in the part, it is not satisfactory for cutting the peripheral shape of such irregularly shaped parts, and thus cannot fully satisfy the need for full mechanization.

One difficulty of automating apparatus for making parts is that the parts in the punch press have been removed manually such that the positioning of the part in the subsequent automated machine must be repeated along with the additional programming of the machine.

SUMMARY OF THE INVENTION

It is an object of this invention to provide an apparatus for transferring a part from a turret punch press to a second machine while maintaining a high degree of accuracy in the location and angular attitude of the part in the second machine.

It is another object to provide an improved part transferring mechanism.

The term "automatic" used throughout this application means not only programmed control wherein the program is recorded on cards, tapes or in a larger general or special purpose computer, but the term also means manual remote control in which an operator is manually actuating the controls from a remote console. The invention is best utilized in the fully computerized automatic mode, however.

The objects of the invention are best obtained by a transfer mechanism that, through predetermined, accurate arcuate and linear motions, engages the part at some predetermined location and attitude and positions the part into a subsequent apparatus, such as, in the preferred embodiment, the contouring apparatus of this application. It is understood, however, that the accurate attitude and location control offered by the transfer mechanism also makes the mechanism a useful addition to a turret-type punch press for other handling operations.

The transfer mechanism of the preferred embodiment includes an arm pivotally mounted on a slider. The slider is provided with gauging means which can be brought into abutment with a gauging surface on the numerically controlled, workpiece positioning portion of the punch press. In this manner, the position of a part engaging clamp on the arm, both as to attitude and location, is mechanically slaved to the punch press relative to a reference point on the part. The part engaging clamp can be positioned along the arm, however, by an independent servo motor, if desired. The part is then swung by the transfer arm and, in the preferred embodiment, the contouring apparatus is positioned to receive the part in a correct angular attitude and with the reference point located exactly in the center of a rotary chuck on the contouring apparatus.

BRIEF DESCRIPTION OF THE DRAWING

FIG. 1 is a isometric of a punching and contouring apparatus embodying the principles of the invention.

DETAILED DESCRIPTION OF THE PREFERRED EMBODIMENT

General Description

Figure 2:
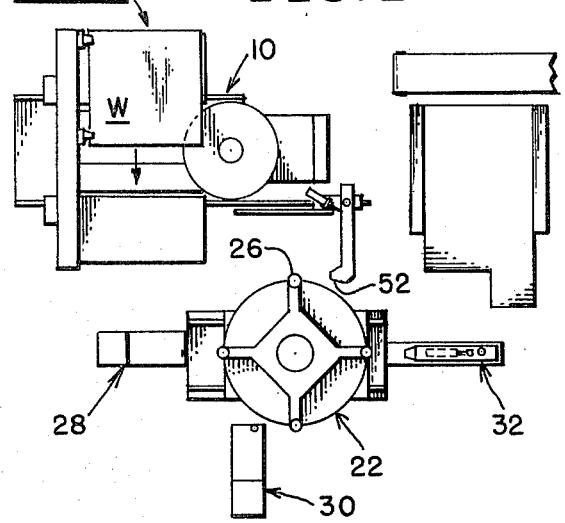
FIGS. 2–7 are schematic, plan, operational views illustrating a sequence of operation of the apparatus shown in FIG. 1.

As best illustrated in FIG. 1, the preferred punching and contouring apparatus employing various inventive features includes a rotary turret-type, numerically controlled punch press 10, preferably of the type illustrated in U.S. Pat. No. 3,717,061, the description of which is incorporated herein by reference thereto. Alternatively, conventional punch presses of the type having a rotary turret for holding a multiplicity of tools can also be adapted by those skilled in the art to embody the principles of the invention. The punch press 10 includes a multiple tool turret 12 having a plurality of standard tools and a special tool and clamping mechanism as will be described herein below. In addition, the punch press is provided with workpiece positioning means 14 that locates by numerical or other suitable control a worksheet W beneath a punching station at the turret. In the preferred form of punch press illustrated, the workpiece positioning means 14 includes a side table 16 that moves with the worksheet along the Y axis of the punch press. As will be described in more detail below, the side table is provided with a gauging block 18 that can be accurately located along the Y axis by the side table and serves to position a transfer mechanism 20.

The transfer mechanism 20 is basically a pivotal arm type, such as generally illustrated in U.S. Pat. No.

3,815,403, the details of which are incorporated by reference thereto. The transfer mechanism is adapted to move along the Y axis and swing a part P between the punch press and the contouring apparatus to position the part very accurately in the contouring apparatus.

The contouring apparatus 22 is located adjacent the punch press 10 and includes, in general, a rotary turret 24 movable between four stations. The turret includes four arms, each carrying a rotary chuck or part holder 26. The turret moves the rotary chuck first to a cutting apparatus 28, thence to a deburring apparatus 30, and finally to a discharge station where the part is removed from the chuck by a second transfer mechanism 32 which can then deliver the part to a subsequent fabricating apparatus, such as a surface finishing machine or a folding machine 34.

PART SEPARATION FROM WORKSHEET

Figure 8:
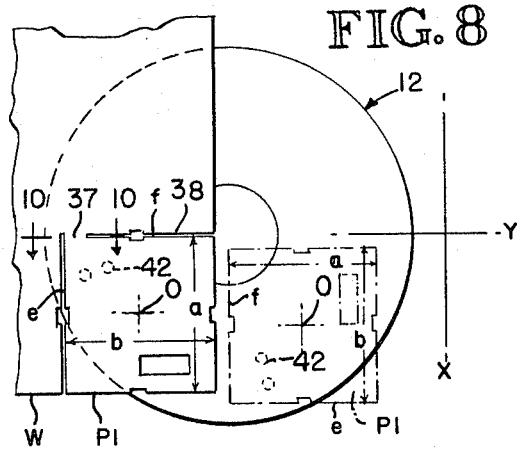
FIG. 8 is a fragmentary horizontal section of a portion of the punch press shown in FIG. 1 illustrating the separation of a part from a larger workpiece.
Figure 10:
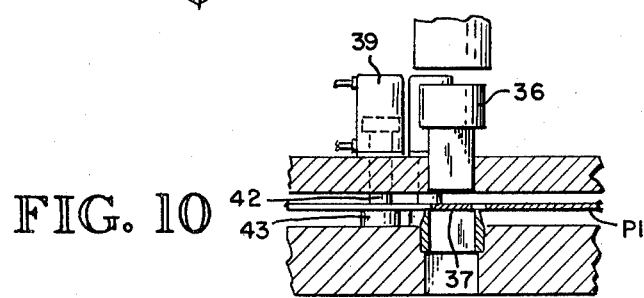
FIG. 10 is a fragmentary vertical section taken along the line 10—10 of FIG. 8.

In this apparatus, a multiple number of parts can be removed from a larger worksheet while the worksheet remains in the punch press. For this purpose and as best shown in FIGS. 8 and 10, the turret 12 is provided with a special tooling which includes a conventional thin-section punch and die 36 suitable for cutting through the remaining piece of material 37 connecting the part P-1 with worksheet W after the part has been completely nibbled substantially free of the worksheet only lines 38. The internal notches, openings, etc., necessary in the part P-1 are made using conventional punch press procedures. Next, the edge 38 is nibbled on all sides connected to the worksheet W, leaving the one connected portion 37 remaining. The turret 12 is then rotated until the tool 36 is positioned beneath the striker of the punch press.

On the turret 12, adjacent the special tool 36, are two or more (two illustrated) clamps. Each clamp includes a pneumatically operated piston rod 42 which can be thrust downwardly against the part holding it against a block 43. With the two clamps engaging the part, the punch 36 can then be actuated, severing the last remaining connection with the worksheet. While still clamped, the part is then rotated 90° by the turret 12 to the side of the punch press to the part removal station while the worksheet is withdrawn by the worksheet positioning means 14. At this time, the part separation is complete, with the part P-1 being in a position laterally of the side of the punch press, where, upon raising clamp piston rods 42, it is easily accessible for removal. After removal, the next part can be punched and the separation procedure repeated.

TRANSFER MECHANISM

As is readily understood, the size of the parts P may vary for each different worksheet W and, if desired, may even vary within a single worksheet. As a result, it is necessary in the preferred embodiment that the part P be positioned in the punch press 10, transfer mechanism 20 and, ultimately, in the chuck 26 in a predetermined and accurate manner so that programmed controls can be utilized. Since the final separation of the part from the worksheet always occurs at the same corner, the upper left-hand corner, as shown in FIG. 8, edge e of the part will always be at the same distance from the outside of the turret 12, regardless of the size of the part.

The invention of this application provides a transfer mechanism that can engage the part always at a known location along the X axis of the punch press. The dimension $a$ of the part, however, may vary. This variance, as will be seen, is uniquely provided for in the preferred embodiment by slaving the transfer mechanism to the NC controls of the punch press. Furthermore, in positioning the transfer mechanism relative to the part, it is also important to engage the part with reference to some predetermined reference point O, which, as will be described, becomes the center of rotation of the part in the part holder 26. Preferably, although not necessarily, the reference point O is at the approximate geometrical center of the part.

Figure 9:
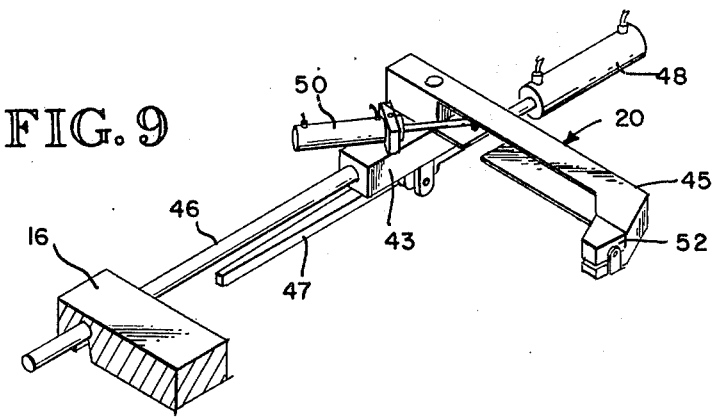
FIG. 9 is a fragmentary isometric of the transfer mechanism used in the apparatus in FIG. 1.

As best shown in FIGS. 1 and 9, the preferred transfer mechanism 20 includes a transfer arm 45 pivotally mounted on a slider 43. The slider is slidably mounted on a rail 46 which forms a part of the punch press 10. The movable side table 16 of the punch press also slides on the rail 46, as more fully described in U.S. Pat. No. 3,717,061. The slider 43 is provided with a gauge bar 47 which abuts against the gauge block 18 on the movable side table. A pneumatic ram 48 slides the slider between a fully retracted position, as shown in FIG. 9, and a fully extended position, as limited by the position of the gauge block 18. The arm is swung about its pivot by a second pneumatic ram 50 between two positions at a 90° angle with each other, that is, either fully parallel or fully perpendicular to the X axis of the punch press 10. Suitable details of construction for the transfer mechanism 20 can be obtained from said U.S. Pat. No. 3,815,403, including a suitable part clamp 52 for releasably holding the part.

In operation, the input of the computer or other control for the punching and contouring apparatus will receive the information as to the dimensions of the outer periphery of the part, namely dimensions $a$ and $b$, as shown in FIG. 8, and the locating data for reference point O. After the part has been rotated 90° to its discharge position, the dimension $a$ will be used to position the clamp 52 of the transfer mechanism. Although there are various techniques for moving the side table 16 and the slider 43, the preferred operation is to first return the side table 16 to the left to its home position along the Y axis of the machine. As the distance between the end of gauge bar 47 and the center of the clamp 52 is known, the exact position of the clamp 52 along the Y axis when the gauge bar 47 is abutting the block 18 is also known. It is thus a simple calculation to determine the distance that the side table must move from its home position in the Y axis to position the center of the clamp 52 at the reference point O along the dimension $a$ of the part P-1. Thus, if the dimension $a$ is 15 inches and the reference point O is 7½ inches in from the left-hand edge of the part P-1, along dimension $a$ the side table will advance along the Y axis 7½ inches, assuming the center of clamp 52 is aligned with edge $f$ of the part when the side table is in the home position, to position the center of the clamp 52 along the imaginary line passing through reference point O.

As is also best apparent from FIG. 2 of the drawing, the center of the clamp 52, when arm 45 is swung away from the punch press, is also along an imaginary line which passes through the center of the chuck 26 so that by merely swinging the part through a 90° arc, the reference point O is in perfect alignment with the center of the chuck 26. Then, to position the reference point O centrally in the chuck along the dimension $b$ of the part, it is only necessary to move the chuck on the contouring apparatus toward or away from the transfer mechanism 20 the correct distance in a manner similar to the initial positioning of the part in the clamp 52. That is, input known dimension *b* to the control for the punching and contouring apparatus will provide the necessary distance that the chuck 26 must be moved toward or away from the clamp 52 so that the chuck will center itself over the reference point O on the part P-1.

While the preferred embodiment employs a mechanical interconnection to slave the position of clamp 52 relative to the part along the Y axis, it should also be understood that rather than have the arm slide on guide 46, the clamp 52 could be mounted to slide on arm 45, powered by a servo motor to accurately align the clamp by numerical control. Furthermore, various other combinations of arm movement can be utilized, such as, by moving first along the X axis to grab the edge opposite edge *f* and then linearly reciprocating the part along the X axis, plus rotating the arm to place the part in the part holder 26.

CONTOURING APPARATUS

The contouring apparatus 22 is best shown in FIGS. 1 and 2. The apparatus comprises a base 52 on which is mounted a movable carriage 54. The carriage 54 slides on rails 56 in a direction parallel to the Y axis of the punch press. It should be understood at this point that the moveable direction of the carriage 54 need not be parallel to the Y axis of the punch press, but rather, can be any direction which avoids interference with operation of the punch press. The carriage is moved by a conventional worm drive powered by a motor 58. The turret 24 is rotatably mounted on the movable carriage 54 and includes a spider or set of upper arms which can be rotated as shown. The rotary chucks or part holders 26 are positioned at the ends of the arms. Further details of the turret 24 may be obtained from application Ser. No. 386,064. It is, of course, apparent that the turret can be linearly reciprocated and rotated and the chucks or part holders rotated to establish a desired orientation of the parts.

OVERALL OPERATION OF APPARATUS

Figure 3:
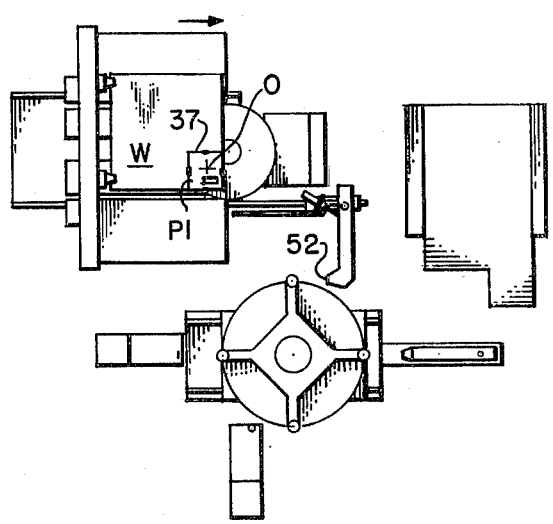
Figure 4:
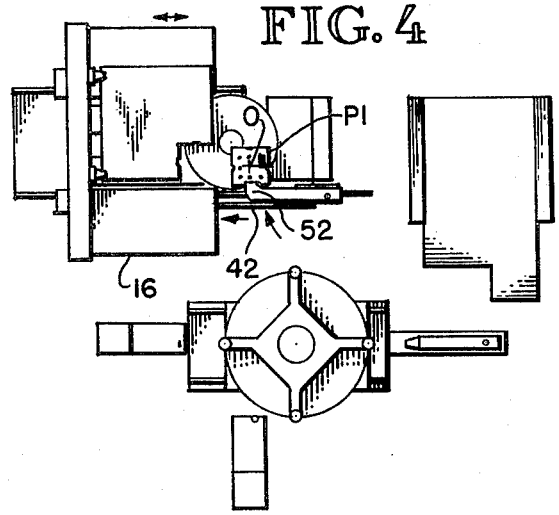
Figure 5:
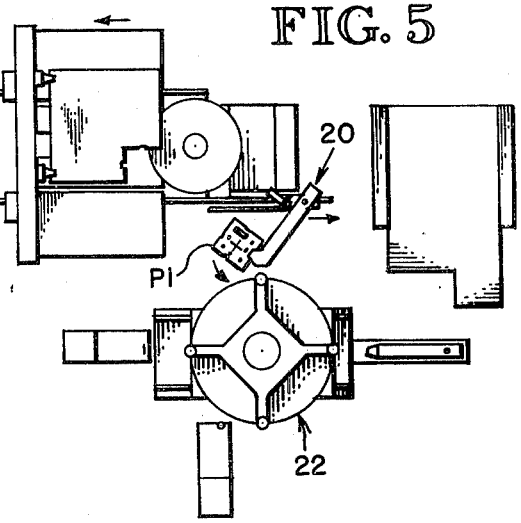

Reviewing the operation, it can be seen that a large worksheet W is placed in the punch press 10 in FIG. 2. At this time, it is assumed that the contouring apparatus 22 is empty. In FIG. 3, a part has been punched with its desired internal hole configuration and the turret 12 moved to the special tooling and clamping station. At this time, the piston rods 42 are actuated to hold the part independently of the worksheet positioning means 14. Next, the final punch 36 removes the last connecting piece of material 37, freeing the part P-1 from the worksheet W. In FIG. 4, the side table 16 is moved to the right from the home position a sufficient distance to allow the gauge 42 to abut against the gauge block 18 and locate the clamp 52 of the transfer mechanism centrally in alignment with the reference point O in the part P-1. In FIG. 5, the part P-1 is moved along the y axis and rotated away from the punch press into a part delivery station. At this point, the part has been completely removed from the punch press, ready to be placed in a contouring apparatus.

Figure 6:
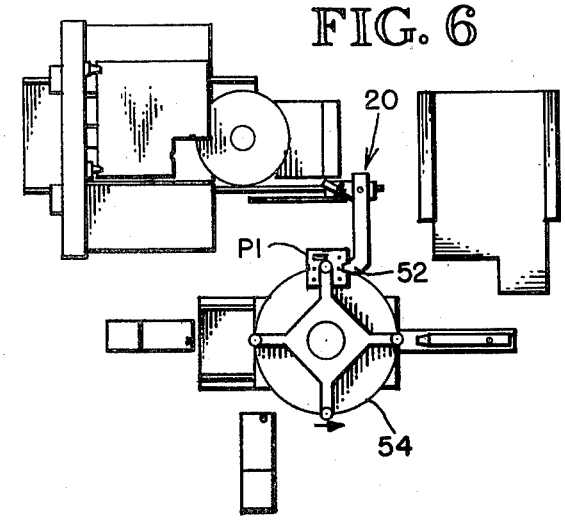
Figure 7:
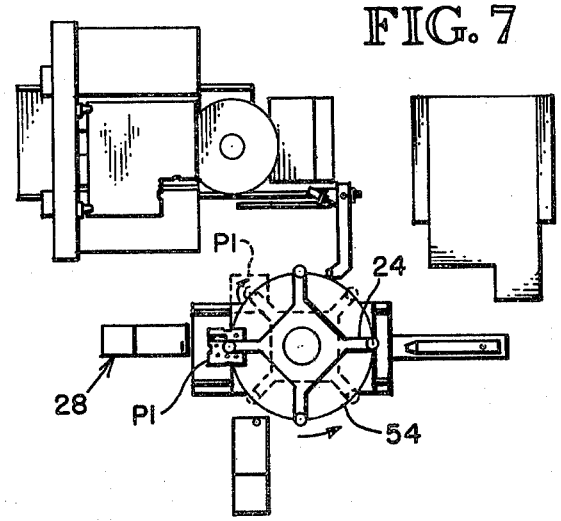

In FIG. 6, the arm 45 remains in its home position, to the right in FIG. 6, while the movable carriage 54 is positioned so that the central axis of the rotary chuck 26 is directly aligned with the reference point O on the part P-1. In FIG. 7, the turret 24 now holds the part. As shown in phantom lines, it can be seen that the part P-1 is simultaneously rotated as it is moved from the receiving position to the cutting station and retains its same angular orientation between the stations. In FIG. 8, the movable carriage 54 is moved toward the cutting apparatus 28 and the part P-1 is rotated with the aforedescribed simultaneous motions of the part and blade attitude to begin to cut a peripheral shape on the part P-1.

While the preferred embodiments of the invention and various inventive features of the invention have been illustrated and described, it should be understood that modifications and variations to each of them will be apparent to one skilled in the art without departing from the principles herein.

The embodiments of the invention in which a particular property or privilege is claimed are defined as follows:

1. A transfer mechanism for accurately removing a sheet material part from a punch press, of the type having a plurality of tools with the worksheet movable beneath said tools in X and Y horizontal mutually perpendicular axes and worksheet positioning means for moving a worksheet along the X and Y axes, and for positioning the part accurately in a part holder of an adjacent apparatus, comprising arm means having a part clamping member at one end, said part clamping member including means for directly engaging the sheet material part, support means pivotally mounting said arm means, powered means for positioning the part clamping member in a first direction relative to the part and along the Y axis a distance in direct correlation with the location of the punch press worksheet positioning means in the same Y axis, means for rotating the arm after clamping the part to align the clamping member with said part holder, means for linearly translating the part holder of the adjacent apparatus toward and away from said part clamping member when said clamping member is rotated from said punch press to position the part in a second direction in the part holder, and control means for so positioning the part holder relative to said clamping member in the second direction according to the dimension of the part in the second direction to exactly position the part in the part holder in a desired orientation and location.

2. The apparatus of claim 1, said punch press including guide means positioned along the Y axis of the punch press, said arm support means being slidably mounted on said guide means, said powered means slidably mounted on said guide means, said powered means slidably moving the support means on said guide means for moving the part clamping member along the Y axis, and gauge means on said arm for contacting said worksheet positioning means of the punch press for positioning the part clamping member according to the dimension of the part in the Y axis.

3. The apparatus of claim 2, said part having known right angle reference axes intersecting at a reference point, program means for recording the location of said reference point, said program means being operatively coupled to said control means for locating the reference axes and point of the part exactly in a predetermined position and orientation in said part holder.

4. The apparatus of claim 2, said worksheet positioning means including a side table movable from a home position, a stop surface on said table for providing a known distance from the table home position, said gauge means including a gauge bar secured to said arm support means and movable into engagement with said stop surface for positioning said part clamping member relative to said stop surface, said worksheet positioning means including means for moving the side table a known distance along the Y axis dependent upon the dimension of the part in the Y axis.

5. The apparatus of claim 4, said side table being movable along the Y axis of the punch press also on said guide means.

6. A transfer mechanism for accurately removing a sheet material part from a part removal station of a punch press, of the type having a turret carrying a plurality of tools and numerically controlled worksheet positioning means for moving a worksheet along first and second perpendicular mutually horizontal axes, and for positioning the part accurately in a part holder of an adjacent apparatus at a part delivery station offset along both said horizontal axes from said removed station, comprising part clamping means for directly grasping said part, means for moving said part clamping means along said first horizontal axis and adapted to be in a first direction relative to said part for directly grasping the sheet material part while in said punch press at a variable location along said first horizontal axis and first direction and for placing said part at said delivery station in said part holder accurately positioned relative to said part holder in said first direction relative to said part so that the part can be operated on by said adjacent apparatus starting from a predetermined location and orientation of said part in said part holder.

7. The transfer mechanism of claim 6, said means for moving said part clamping means including arm means for carrying said part clamping means, means for pivotally supporting said arm means, first powered means for moving said part clamping means along said first horizontal axis, and second powered means for rotating said arm means to said part delivery station at said adjacent apparatus.

8. The transfer mechanism of claim 7, including powered means for positioning said part holder also along said first horizontal axis when said arm means is rotated 90° from said part removal station for locating the part in a second direction relative to said part in said part holder.

9. The transfer mechanism of claim 6, including means for controlling movement of said part clamping means directly dependent upon the position of said numerically controlled worksheet positioning means whereby the location of said part clamping means is determined by the locating of said worksheet positioning means of said punch press.

10. A transfer mechanism for removing a flat worksheet of variable dimensions from a punch press, of the type having a turret carrying a plurality of tools and numerically controlled worksheet positioning means for moving a worksheet along first and second mutually perpendicular horizontal axes relative to the turret, and subsequently accurately and automatically positioning the punched worksheet in a part holder of an adjacent apparatus, comprising:

worksheet clamping means for directly grasping the worksheet while on said punch press, means for moving said worksheet clamping means in two directions for locating said clamping means on said worksheet and locating said worksheet in said part holder, and control means for positioning the worksheet clamping means in one direction relative to said worksheet and at a desired location along one side horizontal axis, said control means including stop means movable in direct relation with said clamping means and engageable with said numerically controlled worksheet positioning means of said punch press for locating said stop means along said one horizontal axis and thus said clamping means at a known distance along said worksheet in direct relation to a numerically controlled movement of said punch press worksheet positioning means whereby the worksheet clamping means is moved by an independent moving means but is located by said numerically controlled worksheet positioning means.

11. The apparatus of claim 10, said means for moving said worksheet clamping means including arm means pivotally mounted on a movable support and means for reciprocating said movable support toward and away from said worksheet positioning means of said punch press, said worksheet clamping means being secured to said arm means remote from said support, said stop means including a gauge bar fixed to said support, said worksheet positioning means including a gauge surface engageable by said gauge bar.

12. The apparatus of claim 10, said means for moving said worksheet clamping means including pivotally mounted arm means.

* * * * *